UNITED STATES PATENT OFFICE.

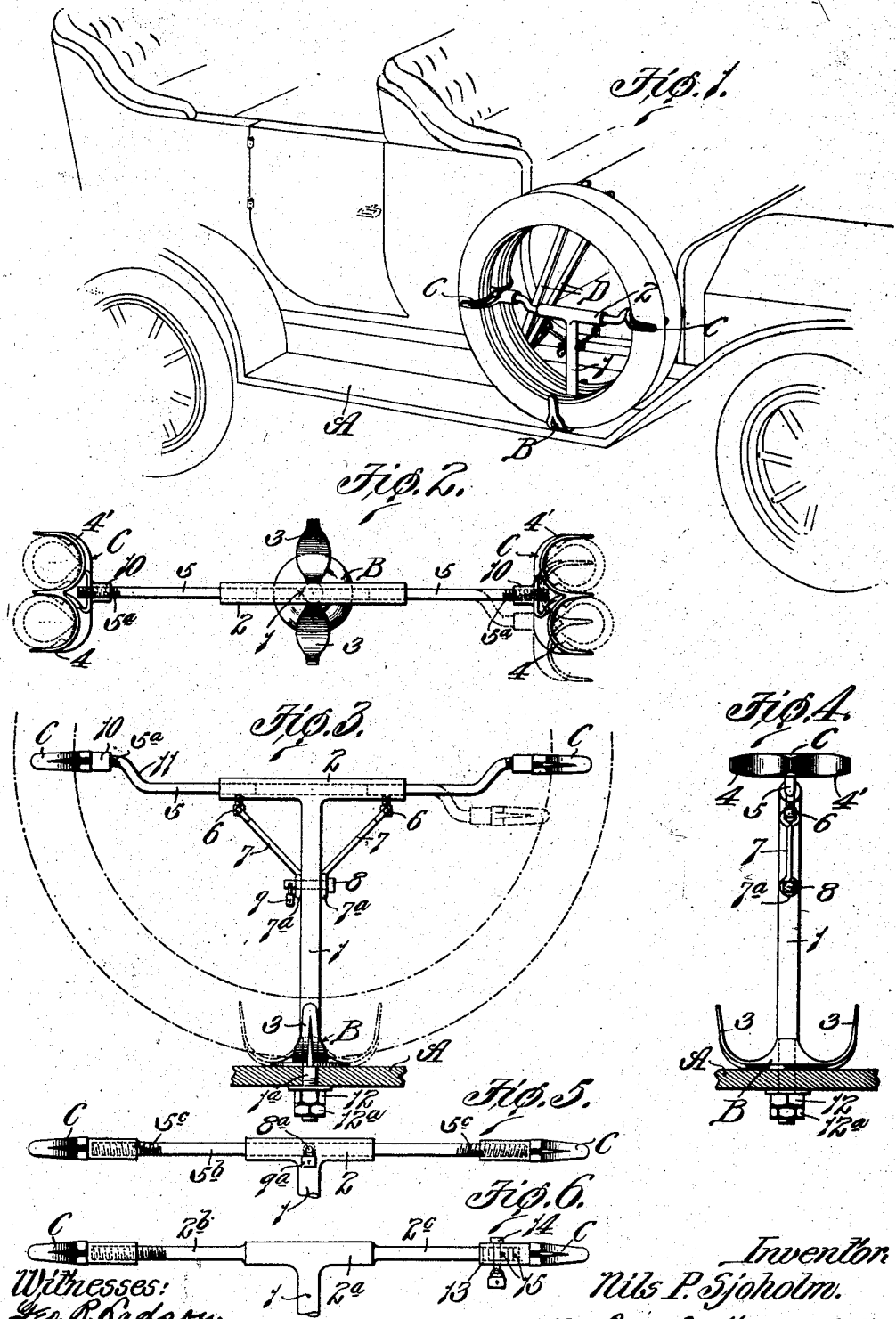

NILS P. SJOHOLM, OF ST. LOUIS, MISSOURI.

TIRE-HOLDER.

1,009,591.  Specification of Letters Patent.  Patented Nov. 21, 1911.

Application filed October 3, 1910. Serial No. 585,065.

*To all whom it may concern:*

Be it known that I, NILS P. SJOHOLM, a citizen of the United States, residing at St. Louis, Missouri, have invented a certain new and useful Improvement in Tire-Holders, of which the following is a full, clear, and exact description, such as will enable others skilled in the art to which it appertains to make and use the same.

This invention relates to tire-holders or tire locks such as are used on automobiles for holding an auxiliary pneumatic tire.

One of the objects of my invention is to provide a tire-holder that is mounted directly on the running board of the automobile, and which is not attached in any way to the body of the automobile, thereby eliminating the use of a large number of fastening devices for retaining it in position and also preventing defacement or marring of the body of the automobile.

Another object is to provide a tire-holder that does not comprise straps and which is so designed that a tire can be removed therefrom or placed in position quickly and easily.

Another object is to provide a tire-holder which can be adjusted to accommodate different-sized tires and also adjusted laterally or away from the body of the automobile so as to hold the tire in such a position that the hand of the operator will not strike against same when he grasps the controlling levers adjacent to which the tire-holders are usually arranged.

Another object is to provide a tire-holder which is so designed that it will not interfere with or prevent a person from entering or leaving that end of the front seat of the automobile at which the tire-holder is arranged.

Another object is to provide a tire-holder which is so designed that the tire-engaging members can be removed easily or turned into such a position that objects will not be apt to catch onto same when the holder is not in use. And still another object is to provide a holder that presents a neat and ornamental appearance and which is so designed that a key-controlled lock can be used on same to prevent an unauthorized person from removing the tire.

Other objects and desirable features of my invention will be hereinafter pointed out.

Figure 1 of the drawings is a perspective view of an automobile provided with a tire-holder constructed in accordance with my invention; Fig. 2 is a top plan view of said tire-holder; Fig. 3 is a side elevational view of same; Fig. 4 is an end view; and Figs. 5 and 6 are side elevational views of slightly modified forms of my invention.

I have herein shown my invention embodied in a double tire-holder but it will, of course, be understood that a single tire-holder is constructed in practically the same manner, the only difference being the shape of the tire-engaging members.

Referring to Figs. 1 to 4 of the drawings which illustrate the preferred form of my invention, 1 designates a standard that projects upwardly from the running board A of an automobile, 2 designates a cross-arm at the upper end of said standard, B designates a tire-engaging member at the lower end of said standard provided with a pair of jaws or yoke-shaped portions 3 for receiving the lower sides of two tires, and C designates tire-engaging members that engage the middle portions of the tires, said members C being provided with jaws or yoke-shaped portions 4 and 4' which are so proportioned that the distance between the jaws 4' is less than the distance between the jaws 4 so as to accommodate two tires of different diameters. The members C are mounted on rods 5 which project into a longitudinally extending bore in the cross-arm 2, and suitable means is provided for adjustably connecting said rods and cross-arm together so as to enable the rods to be moved inwardly or toward each other when it is desired to release the tires and outwardly or away from each other when it is desired to clamp the tires in position. The means herein shown for locking the rods 5 and cross-arm together consists of set screws 6 threaded into said cross-arm, and to eliminate the possibility of an unauthorized person releasing said rods I have provided the set screws with pivotally mounted rigid links 7 having eyes 7ª through which a lock bolt 8 passes, the shank of said bolt having an opening for receiving a padlock 9, as shown clearly in Fig. 3. The tire-engaging members may be either rigidly mounted on the rods 5 or adjustably mounted thereon, the rods 5 of the structure herein shown being provided with screw-threaded portions 5ª which project into internally screw-threaded sleeves or sockets 10 on the members C. I also prefer to bend the rods 5 laterally intermediate their ends or form an offset 11 in same for a purpose hereinafter described. The standard 1 is provided at its lower end with a reduced portion 1ª which passes through an opening in the tire-engaging member B and also through an opening in the running board of the automobile, as shown in Fig. 4, and a clamp nut 12 and jam nut 12ª are screwed onto the reduced portion of said standard so as to securely hold the standard in an upright position.

To remove the tires it is necessary to first unlock the padlock 9, then withdraw the lock bolt 8 so as to release the set screws and then loosen said set screws. The rods 5 can then be moved inwardly or toward each other so as to carry the members C out of engagement with the tires which can then be lifted out of the tire-engaging member B. To secure the tires in position the rods 5 are moved outwardly and after the lock bolt 8 has been inserted in the eyes of the rigid links 7 and the padlock passed through said bolt, it will be impossible for an unauthorized person to remove the tires from the holder.

The rods 5 and the bore in the cross-arm 2 which receives said rods may be of any preferred shape in cross section, and any other suitable means than the set screws 6, links 7 and lock bolt 8 could be employed for locking said rods in adjusted position. The construction herein shown, however, is simple and inexpensive to manufacture, and another desirable feature of same is that the rigid links 7 can be used as levers to tighten or loosen the set screws.

A tire-holder of the construction above described embodies all of the desirable features previously-mentioned in stating the objects of the invention, and in view of the fact that it is carried entirely by the running board, it is possible to arrange it at any desired position on the running board, either close to the side door of the tonneau or close to the fender, at the front end of the running board. Furthermore, a tire-holder of this construction can be adjusted so as to accommodate different-sized tires. If it is desired to use it for retaining a small tire the rods 5 can be given a half turn, as shown in dotted lines in Fig. 3, the bent portions or offsets 11 in said rods causing the tire-engaging members C to lie in a lower horizontal plane so that they will engage the middle portions of a comparatively small tire. By giving the rods 5 a quarter-turn in one direction the tire-engaging members C will be carried laterally or away from the body of the automobile, as shown in dotted lines in Fig. 2, thus holding the upper portions of the tires far enough away from the controlling levers D of the automobile to prevent the hand of the operator from rubbing against said tires when he grasps said levers. When the holder is not in use, or when no tires are mounted in same, the lower tire-engaging member B can be turned into a position extending longitudinally of the running board, and the members C can be turned in a vertical position so that they will lie closer to the body of the automobile. A tire-holder of this construction presents a neat and ornamental appearance, and as the members C which engage the middle portions of the tire are arranged inside of the tire, the device is not as cumbersome-looking as the tire-holders now in general use.

While I prefer to mount the members C on bent rods which are detachably connected to the cross-arm, said members could be mounted on a straight rod 5ᵇ rotatably mounted in the cross-arm 2 and provided with oppositely screw-threaded portions 5ᶜ that project into threaded sockets or sleeves on the members C, as shown in Fig. 5. In such a structure rotary movement of the rod 5ᵇ in one direction causes the members C to move inwardly or toward each other when a tire is mounted in said members, and rotary movement of said rod in the opposite direction causes said members to move outwardly into engagement with the tire, the rod being locked in adjusted position by means of a lock bolt 8ª passing through said cross-arm and rod and having an opening in its shank for receiving a padlock 9ª.

Another slight modification of my invention is illustrated in Fig. 6 wherein the cross-arm 2ª is provided with integral extensions 2ᵇ and 2ᶜ. The extension 2ᵇ has a screw-threaded portion on which one of the members C is adjustably mounted, and the extension 2ᶜ fits loosely in a socket 13 on the other member C, said member being retained in position by means of a lock bolt 14 which passes through said sleeve and one of a plurality of openings 15 in the extension 2ᶜ.

Having thus described my invention, what I claim as new and desire to secure by Letters Patent is:

1. A tire-holder comprising a vertically disposed standard provided at its lower end with means for securing it to the running board of an automobile, a cross-arm on said standard, a supporting means on said cross-arm provided with approximately yoke-shaped members which are adapted to engage the inner side of the tire, means for enabling said yoke-shaped members to be adjusted toward or away from the standard, and offset portions on said supporting means which enable said yoke-shaped members to be adjusted vertically so as to accommodate tires of different diameters.

2. A tire-holder comprising a vertically disposed standard provided at its lower end with means for securing it to the running board of an automobile, a supporting means extending transversely of said standard and provided with members for engaging the inner side of the tire, and means for enabling said tire-engaging members to be adjusted toward and away from each other so as to move them into and out of engagement with the tire, said transversely extending supporting means being so formed that the tire-engaging members can be adjusted vertically and also toward and away from the automobile.

3. A tire-holder comprising a vertically disposed standard that is adapted to be arranged in an upright position on the running-board of an automobile, a cross-arm on said standard, rods rotatably mounted in said cross-arm and provided with offset portions, tire-engaging members adjustably mounted on said rods, devices for retaining said rods in adjusted position, and means for locking said retaining devices.

In testimony whereof I hereunto affix my signature in the presence of two witnesses, this twenty ninth day of September 1910.

NILS P. SJOHOLM.

Witnesses:
WELLS L. CHURCH,
GEORGE BAKEWELL.

---

Copies of this patent may be obtained for five cents each, by addressing the "Commissioner of Patents, Washington, D. C."